United States Patent
Cao et al.

(10) Patent No.: US 9,908,272 B2
(45) Date of Patent: Mar. 6, 2018

(54) THIN WALL APPLICATION WITH INJECTION COMPRESSION MOLDING AND IN-MOLD ROLLER

(71) Applicants: Shipu Cao, Pudong, Shanghai (CN); Qingya Shen, Pudong, Shanghai (CN); Wei Yan, Pudong, Shanghai (CN); Xin Kong, Pudong, Shanghai (CN); Pei Helen Sun, Pudong, Shanghai (CN); Harold Ho, Pudong, Shanghai (CN)

(72) Inventors: Shipu Cao, Shanghai (CN); Wei Yan, Shanghai (CN); Qingya Shen, Shanghai (CN); Xin Kong, Shanghai (CN); Pei Helen Sun, Shanghai (CN); Harold Ho, Shanghai (CN)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 73 days.

(21) Appl. No.: 14/774,484

(22) PCT Filed: Mar. 12, 2013

(86) PCT No.: PCT/CN2013/072484
§ 371 (c)(1),
(2) Date: Sep. 10, 2015

(87) PCT Pub. No.: WO2014/139093
PCT Pub. Date: Sep. 18, 2014

(65) Prior Publication Data
US 2016/0023390 A1    Jan. 28, 2016

(51) Int. Cl.
B29C 45/14        (2006.01)
B29C 45/56        (2006.01)
(Continued)

(52) U.S. Cl.
CPC .... B29C 45/14688 (2013.01); B29C 45/0013 (2013.01); B29C 45/0025 (2013.01);
(Continued)

(58) Field of Classification Search
CPC .......... B29C 45/0013; B29C 45/14688; B29C 45/561; B29C 45/0025; B29C 45/14811;
(Continued)

(56) References Cited

U.S. PATENT DOCUMENTS 4,717,524 A    1/1988    Aoki
5,665,785 A    9/1997    McClellan et al.
(Continued)

FOREIGN PATENT DOCUMENTS

CN    2678874 Y    2/2005
EP    0919351 A2    6/1999
(Continued)

OTHER PUBLICATIONS

English Abstract of WO2006114258(A1); Date of Publication: Nov. 2, 2006; 2 Pages.
(Continued)

*Primary Examiner* — Elizabeth E Mulvaney
(74) *Attorney, Agent, or Firm* — Cantor Colburn LLP

(57) ABSTRACT

A method for making a thin wall component comprise: locating a film (40) in a mold cavity of a mold, wherein the mold cavity has an initial mold thickness, wherein the film comprises a base layer (41) and a pattern layer (42); injecting a molding material (60) into the mold cavity such that the molding material contacts the pattern layer, wherein the molding material comprises a polymeric material and a filler; compressing the mold to a final mold thickness that is less than the initial mold thickness, to form a molded product, wherein the pattern layer forms a surface of the molded product; and removing the molded product from the
(Continued)

mold. A molded product formed by the method. The method produce a thin walled component without warpage, inner stresses, poor surface quality, or washout defects.

19 Claims, 5 Drawing Sheets

(51) Int. Cl.
  *B29C 45/00* (2006.01)
  *B29L 31/34* (2006.01)
  *B29K 105/16* (2006.01)
  *B29K 69/00* (2006.01)
  *B29K 509/08* (2006.01)

(52) U.S. Cl.
  CPC ...... *B29C 45/14065* (2013.01); *B29C 45/561* (2013.01); *B29C 45/14811* (2013.01); *B29C 2045/14155* (2013.01); *B29C 2045/14704* (2013.01); *B29C 2045/14713* (2013.01); *B29K 2069/00* (2013.01); *B29K 2105/16* (2013.01); *B29K 2509/08* (2013.01); *B29L 2031/3481* (2013.01)

(58) Field of Classification Search
  CPC ............ B29K 2069/00; B29K 2105/16; B29K 2509/08
  See application file for complete search history.

(56) References Cited

U.S. PATENT DOCUMENTS

| | | | |
|---|---|---|---|
| 6,548,591 | B2 | 4/2003 | Koning et al. |
| 6,596,800 | B1 | 7/2003 | Zobel et al. |
| 7,514,144 | B2 | 4/2009 | Umetsu et al. |
| 7,684,178 | B2 | 3/2010 | Hsu et al. |
| 8,535,788 | B2 | 9/2013 | Atake et al. |
| 2008/0318074 | A1 | 12/2008 | Suga et al. |
| 2009/0108495 | A1 | 4/2009 | Takeuchi et al. |
| 2010/0072663 | A1 | 3/2010 | Chang |
| 2010/0196651 | A1 | 8/2010 | Liao et al. |

FOREIGN PATENT DOCUMENTS

| | | | |
|---|---|---|---|
| JP | 61125825 | A | 6/1986 |
| JP | 61188457 | A | 8/1986 |
| JP | 63172627 | A | 7/1988 |
| JP | 04074852 | | 3/1992 |
| JP | 699465 | A | 4/1994 |
| JP | 1086189 | A | 4/1998 |
| JP | 200341112 | A | 2/2003 |
| JP | 2004027113 | A | 1/2004 |
| JP | 2004277674 | B2 | 10/2004 |
| JP | 200514286 | A | 1/2005 |
| JP | 201125457 | A | 2/2011 |
| JP | 201125458 | A | 2/2011 |
| JP | 2012201006 | A | 10/2012 |
| WO | 2006114258 | A1 | 11/2006 |

OTHER PUBLICATIONS

European Search Report for European Application No. 13878066.3; dated Sep. 30, 2016; dated Oct. 11, 2016; 10 Pages.
International Search Report for International Application No. PCT/CN2013/072484; International Filing Date Mar. 12, 2013; dated Nov. 28, 2013; 8 pages.
Written Opinion for International Application No. PCT/CN2013/072484; International Filing Date Mar. 12, 2013; dated Nov. 28, 2013; 4 pages.

US 9,908,272 B2

THIN WALL APPLICATION WITH INJECTION COMPRESSION MOLDING AND IN-MOLD ROLLER

CROSS-REFERENCE TO RELATED APPLICATIONS

This application is a 371 of International Application No. PCT/CN2013/072484, filed on Mar. 12, 2013, the contents of which are hereby incorporated herein by reference in their entirety.

BACKGROUND OF THE INVENTION

This disclosure relates to methods of manufacture of thin wall applications, and in particular to methods of manufacture utilizing a thin patter (e.g., in-mold roller (IMR) film) and injection compression molding (ICM), and uses thereof.

High modulus materials such as polycarbonates with filler require high pressure to fill a mold cavity. However, the use of high pressure results in high inner stress and warpage of the final product. In addition, it is difficult to produce thin walls when using a highly filled material. Furthermore, using a highly filled material often results in a poor surface quality requiring additional time consuming finishing techniques such as painting. In addition, the high viscosity of the filled material results in an "ink washout defect" when IMR is employed.

There accordingly remains a need in the art for a process to produce thin walled components using filled materials and low pressures to produce a molded product without warpage, inner stresses, poor surface quality, or washout defects.

SUMMARY OF THE INVENTION

The above-described and other deficiencies of the art are met by a process for manufacturing a thin wall component using injection compression molding and a pattern layer having a thickness of less than 1 mm.

In an embodiment, a method for making a thin wall component comprising: locating an in-mold roller film in a mold cavity of a mold; injecting a molding material comprising a polymeric material and a filler into the mold cavity; compressing the mold; releasing the mold; and ejecting the molded product.

In another embodiment, a method for making a thin wall component comprises: locating a film in a mold cavity of a mold, wherein the mold cavity has an initial mold thickness, wherein the film comprises a base layer and a pattern layer; injecting a molding material into the mold cavity such that the molding material contacts the pattern layer, wherein the molding material comprises a polymeric material and a filler; compressing the mold to a final mold thickness that is less than the initial mold thickness, to form a molded product, wherein the pattern layer forms a surface of the molded product; and removing the molded product from the mold.

The above described and other features are exemplified by the following detailed description.

BRIEF DESCRIPTION OF THE DRAWINGS

The features of the process, equipment, and products described will become apparent from the following detailed description when read in conjunction with the drawings, which are exemplary, not limiting, and wherein like elements are numbered alike in several figures.

DETAILED DESCRIPTION OF THE INVENTION

Figure 1:
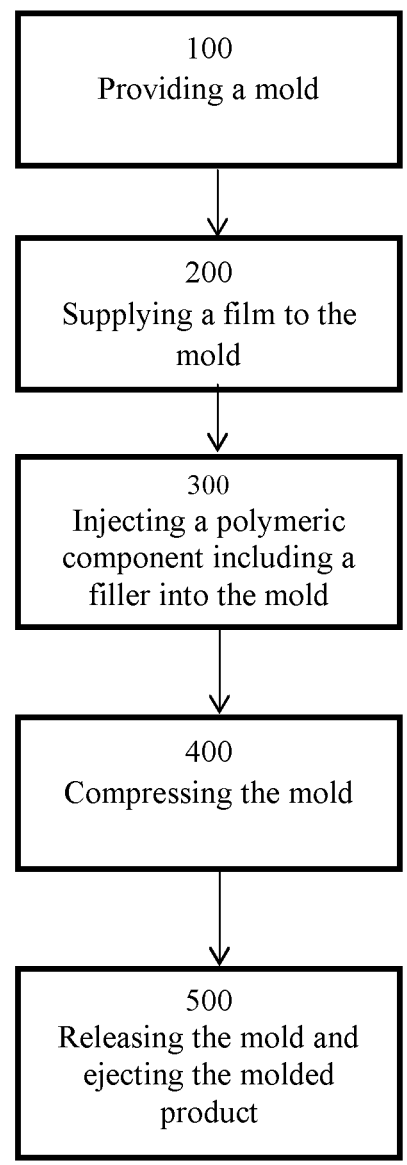
FIG. 1 is a flow diagram of an embodiment of the molding process.

Without being bound by theory, it is believed that the favorable results obtained herein, i.e., a defect free thin wall component made from a highly filled polymeric material (e.g., that comprises 20 to 50 weight percentage (wt %) filler, specifically, 30 to 50 wt %, based upon a total weight of the filled polymeric material), are achieved through the use of in-mold roller film and injection compression molding. This process allows the production of components with a large surface (e.g., greater than or equal to 200 mm by 200 mm), and having a thickness of less than or equal to 1.2 mm, for example 0.8 mm to 1.2 mm, or 0.8 mm to 1.0 mm, wherein the thickness if the final product thickness including the pattern layer. In addition, the molded products formed from the process described below are free from "ink washout" defects that can be associated with an IMR process.

When highly filled thin walled products are prepared using for example, injection molding, they generally require additional processing to attempt to remove defects. Additionally, the molding conditions are difficult. For example, injection molding a component with a base thickness of 1.2 millimeters (mm) with a patterned surface, and comprising a molding material of 50 wt % polycarbonate and 50 wt % glass fiber, entails injection pressures of greater than or equal to 150 bar gauge (barg), and mold temperatures of greater than 90° C. (e.g., a temperatures of greater than or equal to (heat deflection temperature minus 15° C.)). The resultant component has ink washout, visible surface defects, and/or, in some cases, is not even moldable. Often the component needs to be further processed to remove defects (e.g., heated with steam and cooled quickly to eliminate the visibility of filler on the surface).

The present process produces a product which, from the mold, is free of surface defects visible to the unaided eye with normal vision (over an area of greater than or equal to 600 mm$^2$), and/or free of washout, and uses reduced temperatures and/or pressures. This process, for example, when forming a component with a base thickness of 1.2 mm with a 0.02 mm patterned surface layer, and comprising a molding material of 50 wt % polycarbonate and 50 wt % glass fiber, uses injection pressures of less than or equal to 140 barg (specifically, less than or equal to 130 barg, e.g., 100 to 120 barg), and mold temperatures of less than or equal to 80° C. (specifically, less than or equal to 70° C., and even less than or equal to 60° C.). The resultant component is free of surface defects visible to the unaided eye with normal vision (over an area of greater than or equal to 600 mm$^2$), and free of washout.

The present process can use a mold temperature that is based upon the heat deflection temperature (HDT) of the molding material, as determined in accordance with ASTM D 648 on a 3.2 mm unannealed plaque at a pressure of 0.45 megaPascals (MPa). The mold temperature can be less than or equal to the HDT of the molding material minus 25° C., specifically, less than or equal to the HDT of the molding material minus 30° C., more specifically, less than or equal to the HDT of the molding material minus 40° C., and even less than or equal to the HDT of the molding material minus 45° C. In other words, if the HDT of the molding material is 100° C., the mold temperature can be less than or equal to 75° C., specifically, less than or equal to 70° C., more specifically, less than or equal to 60° C., and even specifically, less than or equal to 55° C.

In addition to reducing the molding temperature, the present process reduces the injection pressure needed to mold the component. This can enable the production of components that were not otherwise producible with an injection molding process. In an injection molding process, the molding material is injected into a space the size of the final component. As the size (e.g., thickness) decreases, the amount of pressure to inject the material increases. In the present process, however, a film having the pattern layer is inserted into a mold. The mold has a size greater than the size of the final component (e.g., initial mold size). The molding material is injected into the mold. Then, the mold is compressed to the desired size (e.g., final mold size). Since the initial mold size is larger than the desired component size, the amount of pressure needed to inject the molding material is reduced.

By combining the in-mold roller (IMR) film with the injection compression molding (ICM), the pressure and temperatures of the process are reduced (e.g., compared to making the same size and composition component by injection molding), and the problems associated with injection molding, e.g., ink washout, filler visibility on the surface, and even failure to make a useable component, are solved.

FIG. 1 illustrates a process for manufacturing a thin wall component. In step 100, a mold comprising a mold cavity is provided. Next, step 200 comprises supplying a film (e.g., an in-mold roller film) into the mold, wherein the film has a base layer and a pattern layer. A polymeric component including a filler is injected into the mold at step 300. The mold is compressed in step 400. The mold is released and the molded product is ejected in step 500.

Molding materials can be used for manufacturing of covers or housings for laptops, tablet PCs, smart phones, or other portable electronic devices. The molding materials can comprise polymeric and/or composite materials. Some examples of polymeric materials include thermoplastic materials such as polybutylene terephthalate (PBT); polyetherimides (ULTEM™ resins, commercially available from SABIC Innovative Plastics business); acrylonitrile-butadiene-styrene (ABS); polycarbonate (PC) (LEXAN™ and LEXAN™ EXL resins, commercially available from SABIC Innovative Plastics business); polycarbonate/PBT blends; polycarbonate/ABS blends; copolycarbonate-polyesters; blends of polycarbonate/polyethylene terephthalate (PET)/PBT; polybutylene terephthalate and impact modifier (XENOY™ resins, commercially available from SABIC Innovative Plastics business); as well as combinations comprising at least one of the foregoing. For example, the material can be PC/PBT, a polyolefin (e.g., polypropylene such as glass filled polypropylene, long glass fiber polypropylene, etc.) as well as combinations comprising at least one of the foregoing. Particularly useful polymers include polybutylene terephthalate and impact modifier (XENOY™ resins, commercially available from SABIC Innovative Plastics business), polycarbonate (PC) (LEXAN™ and LEXAN™ EXL resins, commercially available from SABIC Innovative Plastics business), and combinations comprising at least one of the foregoing resins.

The molding material may also include a filler. Possible fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

The filler can be present in an amount of greater than 10 weight percent, for example, greater than 25 wt %, or greater than 40 wt %, e.g., 10 wt % to 50 wt %, or 30 wt % to 50 wt %, wherein the weight percent is based upon the total weight of the molding material. The specific amount of filler depends upon the particular component's wall thickness and design. For example, for a laptop LCD cover (width of 336 millimeters (mm) and length of 232 mm) with a wall thickness of 1.2 mm, 50 wt % of glass fiber can be used to meet requirement of parts strength, wherein the weight percent is based upon a total weight of the molding material.

Figure 2A:
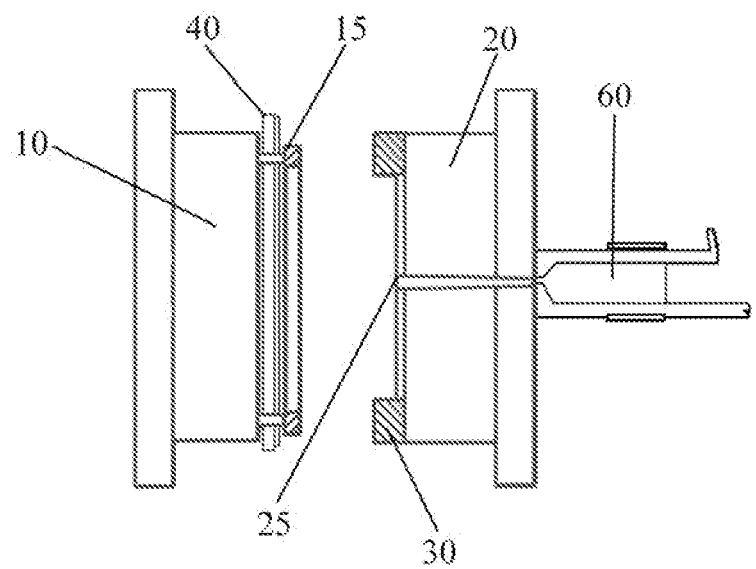
FIGS. 2a-2d are exemplary illustrations of an embodiment of the molding process.

FIG. 2a illustrates Step 100, providing a mold. The mold can comprise two halves, a film side 10, and a polymer side 20. When clamped together, film side 10 and polymer side 20 form a mold cavity. As shown in FIG. 2a, the film side 10 can also include a film press rim 15 for the placement of a film 40 (e.g., an IMR film), associated with Step 200. Rim 15 can include an O-ring for sealing the film in the mold when in use. Vacuum pressure can optionally be employed to hold the film against the inner surface of the film side. Polymer side 20 includes an injection port 25, which allows molding material 60 to be injected into the mold. In addition, polymer side 20 can include a first depth that is approximately equal to the thickness of the molded product. Polymer side 20 can also include a floating rim 30, which is capable of adjusting the depth of the mold cavity. Floating rim 30 can adjust the depth of the mold cavity, for example, through the use of hydraulic cylinders 35. The floating rim is capable of adjusting the cavity depth of the mold by at least 0.5 mm. The floating rim can be capable of adjusting the cavity depth of the mold by 0.5 mm to 3.0 mm, or 0.8 mm to 1.2 mm.

In step 200, a film 40 (e.g., an in-mold roller (IMR) film) is supplied to the mold, e.g., as a sheet, or from a roll (e.g., a roll to roll process). This film comprises a base layer 41 and a decorative layer (pattern) 42, with an optional release layer located between the base layer and the decorative layer. The film may be prepared through various processes. For example, the base layer can be prepared by extrusion, calendaring, or other related processes, while the decorative layer can be made by a coating or deposition process. The base layer has sufficient structural integrity to act as a support or carrier for the pattern layer 42. The pattern layer 42, which will become part of the final product, is a very thin layer, e.g., less than or equal to 0.05 mm, specifically, less than or equal to 0.03 mm thick, more specifically, less than or equal to 0.01 mm thick, e.g., a 0.005 to 0.01 mm thick. The base layer can comprise, for example, polyethylene terephthalate (PET) or another polymer, while the pattern layer can be any material compatible with the molding material and that is desired for the surface of the molded product, e.g., the material can be polymeric, metallic, or a combination comprising at least one of the foregoing.

As shown in FIG. 2a, the film 40 can be located between the surface of the film side 10 of the mold and the rim 15. Optionally, the film 40 can be supplied from a roll. For example, the film 40 can be introduced into the mold from a roll and the base layer 41 can be removed from the mold onto another roll. The pattern layer 42 that contacts the molding material, becomes part of the final product and is removed from the mold therewith. The film 40 comprises a base layer 41 and a pattern 42, wherein the base layer is a support or carrier for the pattern 42 which is removed from the completed product. In the mold, the film 40 is held in place (e.g., through the use of vacuum pumping), in a manner so as to hold the film to the mold surface, e.g., by exhausting air between the film and the mold surface. The vacuum pressure can be maintained through the use of a pump which pulls exhaust air through vents in the film side 10 of the mold. Once vacuum pressure is established, film press rim 15 can be secured and sealed with an O-ring. The mold is then clamped and prepared for the injection of the molding material.

Figure 2B:
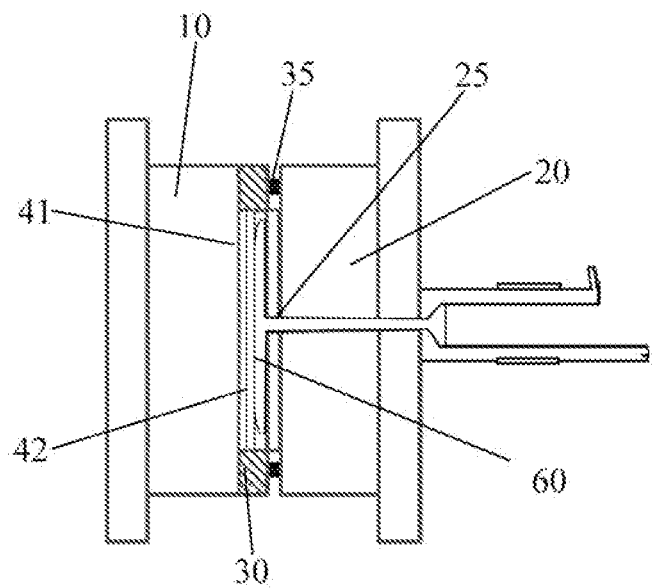

Step 300 is illustrated in FIG. 2b. As shown in FIG. 2b, molding material 60 is injected through injection port 25. Molding material 60 can comprise any combination of fillers and polymeric materials discussed above, such as a polycarbonate material with 50 weight percent glass fiber filler, based upon a total weight of the molding material. In this step, floating rim 30 can extend away from the polymeric side increasing the depth of the cavity between film side 10 and polymeric side 20 prior to, or at the same time as, the injection. Floating rim 30 can move, e.g., through the use of hydraulic cylinders 35. The floating rim 30 can be capable of adjusting the cavity depth of the mold by at least 0.5 mm, for example, 0.5 mm to 3.0 mm, or 0.8 mm to 1.2 mm.

Figure 2C:
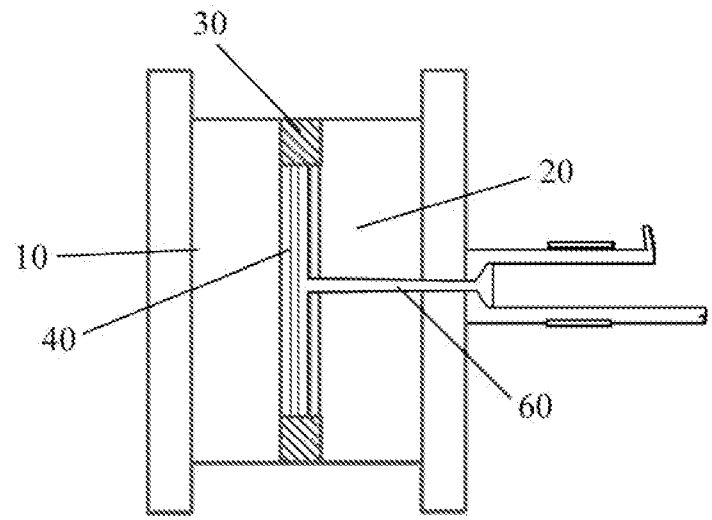

Step 400 is illustrated in FIG. 2c. As shown in FIG. 2c, the mold is compressed, which allows floating rim 30 to return to its original, non-extended position (shown in FIG. 2a). Depending upon the material used, the operating conditions may vary. For example, operating conditions can include a pressure of less than 700 metric tons (MT), e.g., 300 MT to 700 MT, or 200 to 600 MT, or 300 MT to 600 MT, or 200 MT to 500 MT, or a pressure of less than 400 MT, e.g., for a polycarbonate material with 50 weight percent glass fiber filler. The molding temperature is dependent upon the molding material. The temperature can be 50° C. to 150° C., or 75° C. and 125° C., or at least 100° C., or less than 140° C. (e.g., 100° C. to 140° C.). During the compression process, the molding material forms a single molded product with the decorative layer of the film forming an aesthetic surface.

Figure 2D:
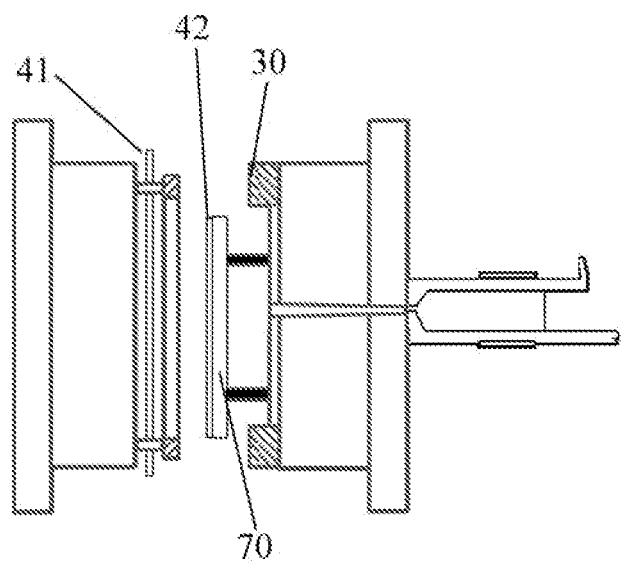

Step 500 is depicted in FIG. 2d. As illustrated in FIG. 2d, the molded product includes molding material 60 and decorative layer 42. When the mold is opened, base layer 45 is separated from the molded product and can be discarded. Accordingly, only the decorative layer is transferred to the molded product 70. The molded product 70, including the pattern layer can be up to 3.0 mm thick, for example, 0.5 to 2 mm thick, or 0.8 mm to 1.2 mm thick, or less than 1.0 mm thick. Molded products formed through the process described above have a surface area of 400 mm$^2$, for example, greater than 500 mm$^2$, or greater than 600 mm$^2$.

The thin film (e.g., IMR film) and ICM process allow for a molded product with a decorative layer that is substantially free from defects, e.g., that is free of ink wash-out or filler (e.g., glass fiber) visible on the surface to the unaided eye with normal vision (also known as 20/20 vision). For example, the surface of the molded product has no visible defects to an unaided eye having normal vision. Normal vision is 20/20 vision for an unaided eye under normal light conditions (luminance level 1 to 10$^6$ cd/m$^2$ (candela per square meter)). The surface of the molded product can be free from defects greater than 0.01 mm$^2$.

The ICM and IMR methods described above also allow for a molded product having low warpage. The molded product can have less than 0.5 mm warpage, for example, less than 0.3 mm warpage across an area of 600 square centimeters (cm$^2$) by checking warpage of all edges with feeler gauge on a marble top.

Figure 3C:
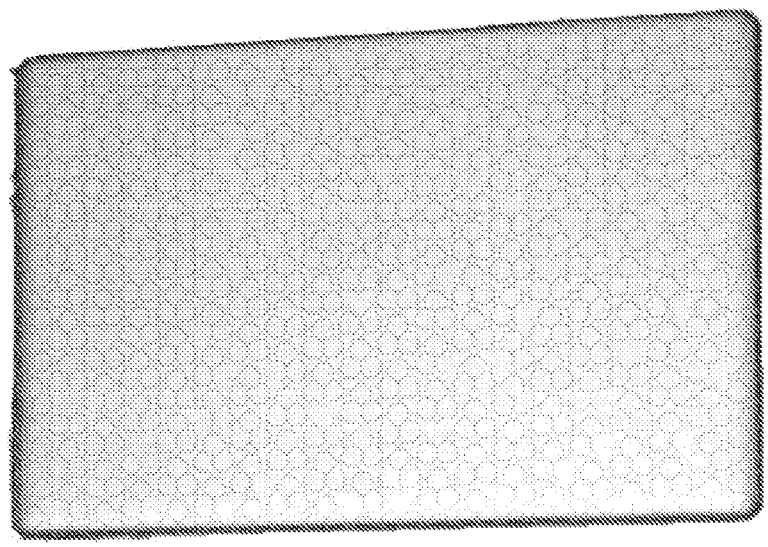
FIGS. 3a-3c are exemplary photographs of molded products.
Figure 3B:
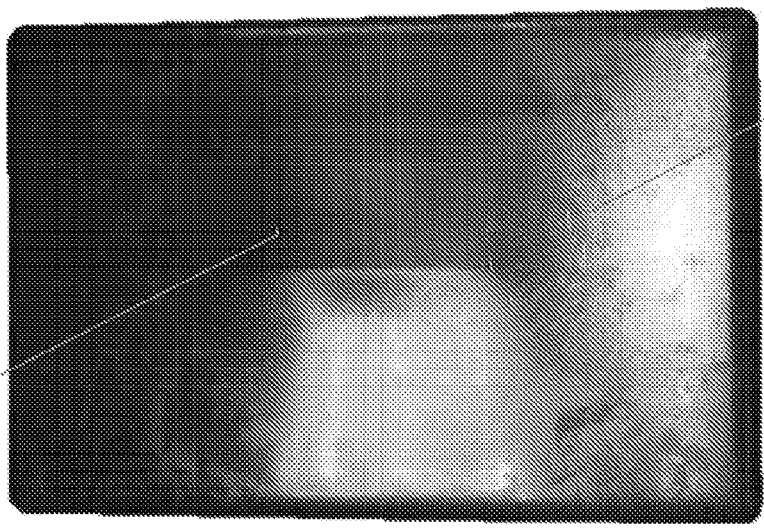
Figure 3A:
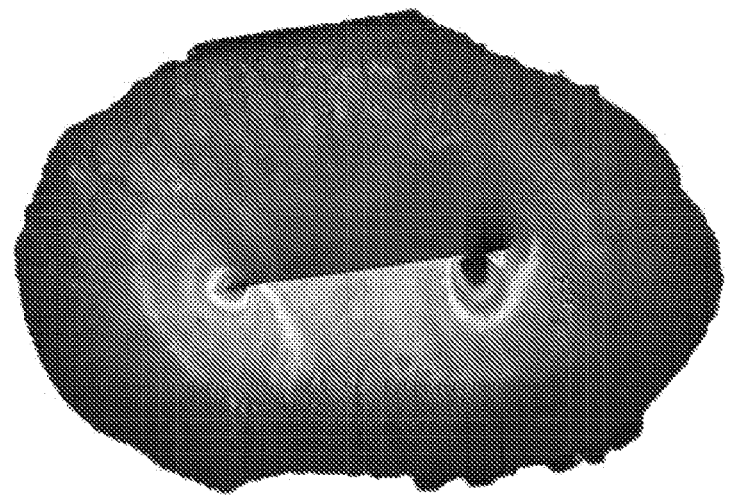

FIGS. 3a, 3b, and 3c demonstrate through comparison the superior quality of molded products formed through the process described above. The product shown in FIG. 3a was formed through an injection process. A molding material comprising polycarbonate with 50 weight percent glass filler was injected into a mold to form a component with 1.2 mm wall thickness, 336 mm in length, and 232 mm in width. Due to the increase in viscosity from the filler, the component could not be fully formed and a useable product could not be produced. FIG. 3b shows the result of a polycarbonate with 50 percent glass filler that was subjected to an injection compression process. As shown in FIG. 3b, the process was able to form a component with 1.2 mm wall thickness, 336 mm in length, and 232 mm in width. However, the surface quality was poor, and included several defects 80 (fibers visible on the surface) that are visible to the naked eye. Thus, additional manufacturing steps would be necessary in order to use the part, which adds to costs and decreases the efficiency of the process. FIG. 3c illustrates a product formed from the method described above. A film was placed in the mold. A molding material comprising polycarbonate with 50 weight percent glass filler was then injected into the mold and subsequently compressed. The mold was subjected to a mold temperature 60° C. on an injection machine with a clamping force 450 MT, and the resultant molded product had a wall thickness of 1.2 mm, a length of 336 mm, a width of 232 mm, with a surface that was free from visible defects. A comparison between FIGS. 3a, 3b, and 3c reveals that the process described herein provides a superior product while eliminating additional processing steps.

The current process enables the formation of a highly filled product (e.g., having greater than or equal to 20 wt %, specifically, greater than or equal to 30 wt %, more specifically, greater than or equal to 40 wt %, and even greater than or equal to 45 wt % filler, based upon a total weight of the molding material (filler and polymer)) with a surface free of defects visible to the unaided eye with normal vision (greater than or equal to 600 cm$^2$ area). The highly filled product can have a low wall thickness, e.g., less than 2.0 mm, specifically, less than or equal to 1.5 mm, and even less than or equal to 1.3 mm, e.g., 1.0 mm to 1.2 mm, including the pattern layer. The pattern layer can have a thickness of less than or equal to 0.05 mm, specifically, less than or equal to 0.02 mm, more specifically, less than or equal to 0.01 mm, e.g., 0.005 mm to 0.01 mm.

Figure 4A:
FIGS. 4a-4b are exemplary photographs of molded products.
Figure 4B:
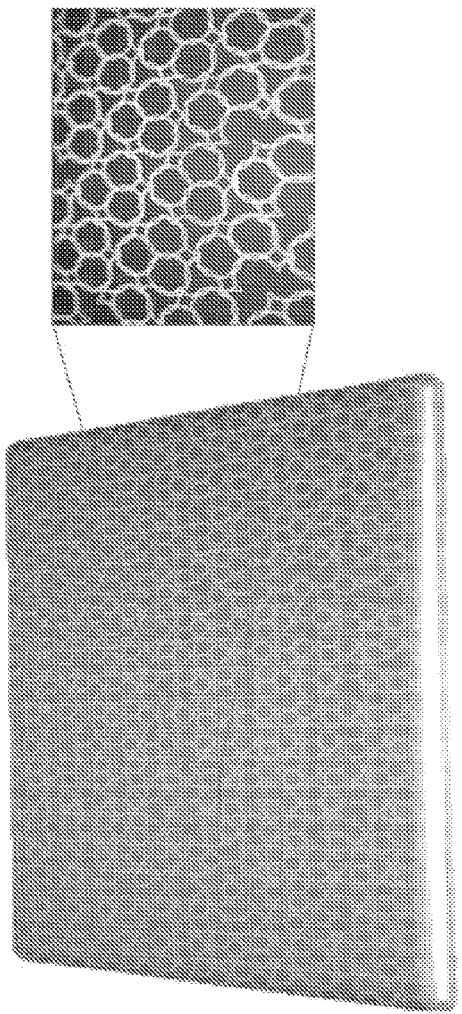

FIGS. 4a and 4b demonstrate through comparison the superior quality of molded products made through the process described above. As shown in FIG. 4a, a molded component was formed from acrylonitrile butadiene styrene (ABS) with no filler through an injection molding process. An IMR film was applied to the molded component. The molded component had a wall thickness of 1.2 mm, a length of 336 mm, and a width of 232 mm. However, the use of IMR without ICM resulted in a molded component that displayed "ink washout" defects, as shown in the enlarged portion. In contrast, FIG. 4b illustrates a molded product made through the process described in above in FIGS. 1 and 2a-2d. The molded product was formed using a molding material comprising polycarbonate with 50 weight percent glass filler. The molded product exhibited no "ink washout" defect and had a wall thickness of 1.2 mm, a length of 336 mm, and a width of 232 mm.

Previously, when molding of high glass filled material, the flow as low and high mold pressures and temperatures were needed to get the material into the cavity. This resulted in poor surface quality. Additionally, the ink could get washed out. In the present process, a combination of in-mold roller (IMR) film and injection compression molding (ICM). This allows lower temperatures, lower pressures, and improved product as compared to the prior molding processes.

Set forth below are some embodiments of the method and products disclosed herein.

Embodiment 1: A method for making a thin wall component comprising: locating an in-mold roller film in a mold cavity of a mold; injecting a molding material comprising a polymeric material and a filler into the mold cavity; compressing the mold; releasing the mold; and ejecting the molded product.

Embodiment 2: A method for making a thin wall component comprising: locating an IMR film in a mold cavity of a mold, wherein the mold cavity has an initial mold thickness, wherein the IMR film comprises a base layer and a pattern layer and wherein the pattern layer has a thickness of less than or equal to 0.05 mm; injecting a molding material into the mold cavity such that the molding material contacts the pattern layer, wherein the molding material comprises a polymeric material and a filler; compressing the mold to a final mold thickness that is less than the initial mold thickness, to form a molded product, wherein the pattern layer forms a surface of the molded product; removing the molded product from the mold; and optionally removing the base layer from the molded product.

Embodiment 3: The method of any of Embodiments 1-2, wherein the film has a thickness of less than or equal to 0.03 mm.

Embodiment 4: The method of any of Embodiments 1-3, further comprising applying vacuum pressure to hold the in-mold roller film to a mold surface of the mold.

Embodiment 5: The method of any of Embodiments 1-4, wherein the mold is a variable cavity depth mold.

Embodiment 6: The method of any of Embodiments 1-5, wherein the molded product has a thickness of less than 2 mm.

Embodiment 7: The method of any of Embodiments 1-6, wherein the molded product has a thickness of 0.8 mm to 1.2 mm.

Embodiment 8: The method of any of Embodiments 1-7, wherein the polymeric material comprises at least one material from polycarbonate, polyamide, acrylonitrile butadiene styrene, polybutylene terephthalate.

Embodiment 9: The method of any of Embodiments 1-8, wherein the filler is present in an amount of greater than or equal to 20 wt %, based upon a total weight of the molding material.

Embodiment 10: The method of any of Embodiments 1-9, wherein the molding material comprises greater than or equal to 20 wt % filler, based upon a total weight of the molding material; wherein the mold final thickness is less than or equal to 1.5 mm; wherein the material has an HDT, and wherein mold temperature is less than or equal to the molding material HDT minus 25° C.

Embodiment 11: The method of any of Embodiments 1-10, wherein the filler is present in an amount of greater than or equal to 40 wt %, based upon a total weight of the molding material.

Embodiment 12: The method of any of Embodiments 1-11, wherein the filler comprises at least one filler from glass fibers, steel fiber, and talc.

Embodiment 13: The method of any of Embodiments 1-12, wherein the mold temperature is less than or equal to the molding material HDT minus 30° C.

Embodiment 14: The method of any of Embodiments 1-13, wherein the mold temperature is less than or equal to the molding material HDT minus 40° C.

Embodiment 15: The method of any of Embodiments 1-14, wherein the polymer is polycarbonate and the filler is glass fibers.

Embodiment 16: The method of any of Embodiments 1-15, further comprising applying vacuum pressure to hold the in-mold roller film to a mold surface of the mold.

Embodiment 17: The method of any of Embodiments 1-16, further comprising removing the base layer from the molded product.

Embodiment 18: A method for making a thin wall component comprising: locating a film in a mold cavity of a mold, wherein the film comprises a base layer and a pattern layer, and wherein the pattern layer has a thickness of less than or equal to 0.05 mm; injecting a molding material into the mold cavity such that the molding material contacts the pattern layer, wherein the molding material comprises a polycarbonate and greater than or equal to 20 wt % fibers, based upon a total weight of the molding material; compressing the mold to a final mold thickness of less than or equal to 1.5 mm, to form a molded product, wherein the pattern layer forms a surface of the molded product; and removing the molded product from the mold.

Embodiment 19: The method of any of Embodiments 1-18, further comprising introducing the film to the mold cavity from a roller and removing the base layer from the mold cavity with another roller.

Embodiment 20: A method for making a thin wall component comprising: moving a film from a roller into a mold cavity of a mold, wherein the mold cavity has an initial mold thickness, wherein the film comprises a base layer and a pattern layer, and wherein the pattern layer has a thickness of less than or equal to 0.05 mm; injecting a molding material into the mold cavity such that the molding material contacts the pattern layer, wherein the molding material comprises a polymeric material and a filler; compressing the mold to a final mold thickness that is less than the initial mold thickness, to form a molded product, wherein the pattern layer forms a surface of the molded product; removing the molded product from the mold; and removing the base layer from the mold onto another roller.

Embodiment 21: A molded product formed by the method of any of Embodiments 1-20.

Embodiment 22: The molded product of Embodiment 21, wherein the molded product is substantially free from defects.

Embodiment 23: The molded product of any of Embodiments 21-22, wherein the molded product is substantially free from warpage.

Embodiment 24: The molded product of any of Embodiments 21-23, wherein the molded product has a surface area of at least 600 mm$^2$.

Embodiment 25: The molded product of any of claims 21-24, wherein the surface of the molded product is free from defects greater than 0.01 mm$^2$ over an area of greater than or equal to 600 cm$^2$.

Embodiment 26: The molded product of any of Embodiments 21-25, wherein the molded product has a warpage of less than 0.5 mm across an area of 600 cm$^2$ as determined by checking warpage of all edges with feeler gauge on a marble top.

The singular forms "a," "an," and "the" include plural referents unless the context clearly dictates otherwise.

"Or" means "and/or."

The modifier "about" used in connection with a quantity is inclusive of the stated value and has the meaning dictated by the context (e.g., includes the degree of error associated with measurement of the particular quantity).

The notation "±10%" means that the indicated measurement can be from an amount that is minus 10% to an amount that is plus 10% of the stated value.

The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.).

The suffix "(s)" is intended to include both the singular and the plural of the term that it modifies, thereby including at least one of that term (e.g., the colorant(s) includes at least one colorants).

"Optional" or "optionally" means that the subsequently described event or circumstance can or can not occur, and that the description includes instances where the event occurs and instances where it does not.

Unless defined otherwise, technical and scientific terms used herein have the same meaning as is commonly understood by one of skill in the art to which this invention belongs.

A "combination" is inclusive of blends, mixtures, alloys, reaction products, and the like.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A method for making a thin wall component comprising:
    locating a film in a mold cavity of a mold, wherein the mold cavity has an initial mold thickness, wherein the film comprises a base layer and a pattern layer, and wherein the pattern layer has a thickness of less than or equal to 0.05 mm;
    injecting a molding material into the mold cavity such that the molding material contacts the pattern layer, wherein the molding material comprises a polymeric material and a filler;
    compressing the mold to a final mold thickness that is less than the initial mold thickness, to form a molded product, wherein the pattern layer forms a surface of the molded product;
    removing the molded product from the mold; and
    removing the base layer from the molded product,
    wherein a mold temperature is less than or equal to a heat deflection temperature of the molding material minus 25° C.

2. The method of claim 1, wherein the film has a thickness of less than or equal to 0.03 mm.

3. The method of claim 1, further comprising applying vacuum pressure to hold the film to a mold surface of the mold.

4. The method of claim 1, wherein the mold is a variable cavity depth mold.

5. The method of claim 1, wherein the molded product has a thickness of less than 2 mm.

6. The method of claim 1, wherein the polymeric material comprises at least one material from polycarbonate, polyamide, acrylonitrile butadiene styrene, polybutylene terephthalate.

7. The method of claim 1, wherein the filler is present in an amount of greater than or equal to 20 wt %, based upon a total weight of the molding material.

8. The method of claim 1, wherein the molding material comprises greater than or equal to 20 wt % filler, based upon a total weight of the molding material; and wherein the mold final thickness is less than or equal to 1.5 mm.

9. The method of claim 1, wherein the filler comprises at least one filler from glass fibers, steel fiber, and talc.

10. The method of claim 1, wherein the mold temperature is less than or equal to the molding material heat deflection temperature minus 30° C.

11. The method of claim 1, wherein the polymeric material is polycarbonate and the filler is glass fibers.

12. The method of claim 1, further comprising introducing the film to the mold cavity from a first roller and removing the base layer from the mold cavity with another roller.

13. A molded product formed by the method of claim 1.

14. The molded product of claim 13, wherein the surface of the molded product is free from defects greater than 0.01 mm$^2$ over an area of greater than or equal to 600 cm$^2$.

15. The molded product of claim 13, wherein the molded product has a warpage of less than 0.5 mm across an area of 600 cm$^2$ as determined by checking warpage of all edges with feeler gauge on a marble top.

16. The molded product of claim 13, wherein the molded product has a surface area of at least 600 mm².

17. A method for making a thin wall component comprising:
- moving a film from a roller into a mold cavity of a mold, wherein the mold cavity has an initial mold thickness, wherein the film comprises a base layer and a pattern layer, and wherein the pattern layer has a thickness of less than or equal to 0.05 mm;
- injecting a molding material into the mold cavity such that the molding material contacts the pattern layer, wherein the molding material comprises a polymeric material and a filler;
- compressing the mold to a final mold thickness that is less than the initial mold thickness, to form a molded product, wherein the pattern layer forms a surface of the molded product;
- removing the molded product from the mold; and
- removing the base layer from the mold onto another roller, wherein a mold temperature is less than or equal to a heat deflection temperature of the molding material minus 25° C.

18. The method for making a thin wall component of claim 1, wherein the filler is present in an amount between 20-50 wt %, based upon a total weight of the molding material.

19. The method for making a thin wall component of claim 17, wherein the filler is present in an amount between 20-50 wt %, based upon a total weight of the molding material.

* * * * *